June 13, 1961 SEIUEMON INABA 2,988,643

AUTOMATIC CURVE TRACER

Filed Dec. 3, 1958 3 Sheets-Sheet 1

June 13, 1961 SEIUEMON INABA 2,988,643

AUTOMATIC CURVE TRACER

Filed Dec. 3, 1958 3 Sheets-Sheet 3

2,988,643

AUTOMATIC CURVE TRACER

Seiuemon Inaba, Kawasaki-shi, Japan, assignor to Fuji Tsushinki Seizo Kabushiki Kaisha, Kawasaki-shi, Japan Filed Dec. 3, 1958, Ser. No. 777,885
Claims priority, application Japan Dec. 14, 1957
3 Claims. (Cl. 250—202)

This invention relates to the method of composing an automatic curve tracing device, to be applied, for example, in the automatic oxygen disconnecter, automatic curve indicator, and etc., in which the so-called PN junction diodes are employed.

It is widely known that an electric output can be obtained when a PN junction diode is illuminated by rays of light. This invention relates to the method of composing the apparatus that has a function of tracing a curve automatically by applying such characteristic of the PN junction diode.

The electric output voltage generated when the PN junction diode is illuminated by rays of light will come to have the magnitude proportional to that of the surface area of the diode illuminated by the rays. Consequently, when two diodes are placed under the conditions of a constant luminosity, and so on, alteration of the illuminated area of either diode will produce a voltage difference between the output voltages of the two diodes.

Figure 1:
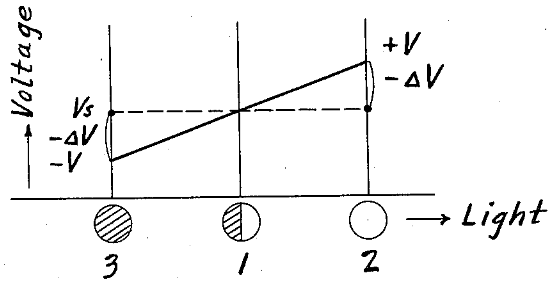
FIG. 1 is a diagrammatic sketch illustrating the relationship of the PN diodes and their theoretical operation.

In FIG. 1, 1 shows the PN junction diode, half surface of which is covered with a mask, and it is placed as a standard diode and the magnitude of the output voltage of which is expressed by $V_s$. PN junction diode 2 is illuminated by the input rays on its whole surface, while PN junction diode 3 shows the diode which is not illuminated by the input rays, diodes 2, 3 having the magnitude V or —V as the output voltage decreased or increased, respectively, by V as compared with the output voltage $V_s$ of the standard diode.

Accordingly, V or —V, the output voltage difference betwen the standard diode 1 and another diode 2 or 3, respectively, can be detected as the voltage difference, which can be used for the purpose of controlling the scanning mechanism along the idea of the present invention that will be described later on.

According to this invention an optical device, in which one standard PN junction diode half surface of which is masked as has been explained in FIG. 1 and two PN junction diodes for scanning that can be illuminated on their whole surface are arranged, is equipped the top of the scanning mechanism, and by picking up the output voltage differences developed between these two scanning diodes and the standard one and then supplying the voltage differences to the servomechanism executing the position control of the scanning mechanism the curve tracing work is forced to run automatically.

The curve to be traced is drawn, for instance, on a paper, and the optical device prepared for the scanning mechanism is arranged to locate over this paper. In this case, the reflected rays from the paper surface are derived into the optical apparatus and illuminate three diodes. Consequently, a proper choice of the arrangement 3 diodes and that of optical device will enable the reflected rays derived into the optical apparatus as the input rays to illuminate whole of the masked half surface always in the standard diode, while two scanning diodes are illuminated in accordance with the curve drawn on the paper.

Figure 2:
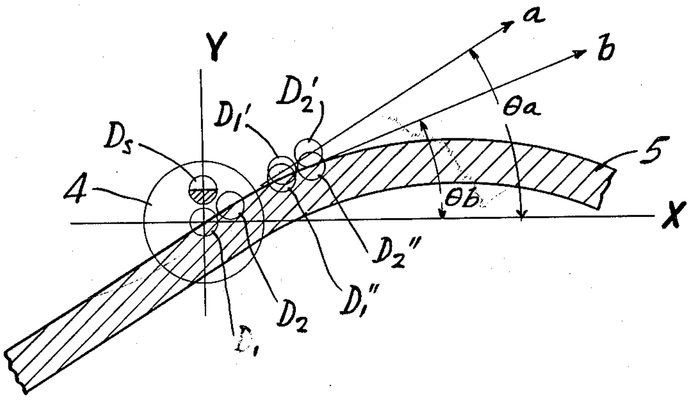
FIG. 2 is a diagrammatic sketch illustrating in plan view the position of PN diodes in scanning head and their relation to a curve.

FIG. 2 shows the relation between the arrangement of three PN junction diodes in the scanning head equipped with the optical device for the scanning mechanism and the curve to be traced by such device.

In the scanning head 4 equipped with optical device are arranged one scanning diode $D_1$, located at its centre, and another scanning diode $D_2$ and standard diode $D_s$ half surface of which is masked, both located at off-centred positions, as shown in the figure. Two scanning diodes $D_1$, $D_2$ and standard one $D_s$ are mutually connected electrically, and so the difference of the magnitude of the output voltage between each of the former and the latter can be picked up as the voltage difference. Function of the scanning head will be explained hereunder.

Scanning diodes $D_1$, $D_2$ are respectively placed at such positions where the illuminated areas will be halved by the curve 5. In this case the output voltage of the scanning diodes $D_1$, $D_2$ and that of the standard diode $D_s$ becomes equal, and the voltage difference between them is zero. Then the line connecting 2 diodes $D_1$, $D_2$ will make angle ($\theta_a$) with abscissa axis X, and if the scanning mechanism is controlled in this state by the servomechanism that will be described later, scanning mechanism 4 equipped with scanning head moves straightforwards in the direction indicated by the arrow. If the scanning head 4 moves to the positions $D_1'$, $D_2'$ in the figure, the illuminated areas of scanning diodes $D_1$, $D_2$ are altered respectively, and the result of such process voltage differences will be developed between scanning diodes $D_1$, $D_2$ and standard diode $D_s$. Consequently, diode $D_2$ is transferred from position $D_2'$ to $D_2''$ through the servomechanism by the voltage difference produced between scanning diode $D_2$ and standard diode $D_s$. On the other hand the voltage difference produced between scanning diode $D_1$ and standard diode $D_s$ will move diode $D_1$ from $D_1$ position to $D_1''$ position. In this case, the straight lines (*a*) and (*b*) can be regarded as approximate tangents of the traced curve 5 at the positions $D_1$ or $D_2$ and $D_1''$ or $D_2''$, respectively. Thus the scanning head is pushed ahead with the transfer to such position where one half of the illuminated area of the two scanning diodes $D_1$ and $D_2$ is always hidden by the line 5 moving straight forward along the lines (*a*), (*b*) . . . and consequently goes on tracing the curve 5 automatically.

The movement of the scanning head is controlled by means of two systems of servomechanism in the following manner.

The voltage difference produced between the first diode $D_1$ and the standard diode $D_s$ is applied to the first system of the servomechanism, through which the scanning head is so controlled that its center (i.e. the first scanning diode) is always located on the curve to be traced. Meanwhile the voltage difference produced between the second scanning diode $D_2$ and the standard diode $D_s$ is applied to the second system of the servomechanism, through which the scanning head is controlled so that it rotates round its center and its scanning direction always coincides with an approximate tangent of the traced curve at the position at which the head is located.

Figure 3:
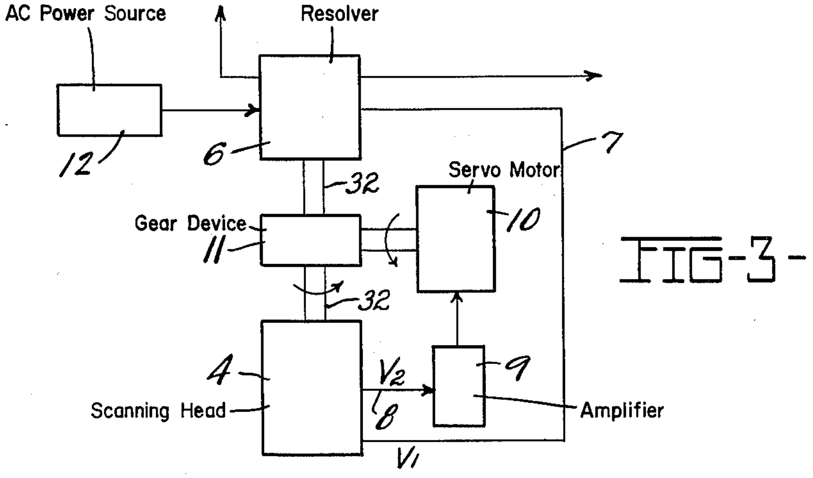
FIG. 3 is a block diagram of the scanning mechanism of the invention.

FIG. 3 shows the scanning mechanism mentioned above and the servomechanism of the second system which carries out the rotation control of the scanning head. Scanning head 4 is mechanically combined with resolver 6 through rotation axis. Scanning head 4 is equipped with, as has already been explained, three diodes, and voltage difference $\Delta V_1$ between standard diode $D_s$ and first scanning diode $D_1$ is picked up via line 7 to be supplied to resolver 6; on the other hand voltage difference ($\Delta V_2$) between standard diode $D_s$ and second scanning diode $D_2$ is supplied to servomotor 10 via line 8, and amplifier 9. Servomotor 10 is combined with the rotation axis through gear device 11. Amplifier 9, servomotor 10, and gear device 11 compose the servomechanism of the second system mentioned above. That is, if the voltage difference ($\Delta V_2$) is generated between standard diode $D_s$ and second scanning diode $D_2$ in FIG. 2, servomotor 10 will be driven work, and the rotation of scanning head 4 will be controlled together with resolver 6 with the centre of the head as the axis. The direction of their rotation is determined by sign of voltage difference $\Delta V_2$.

Figure 4:
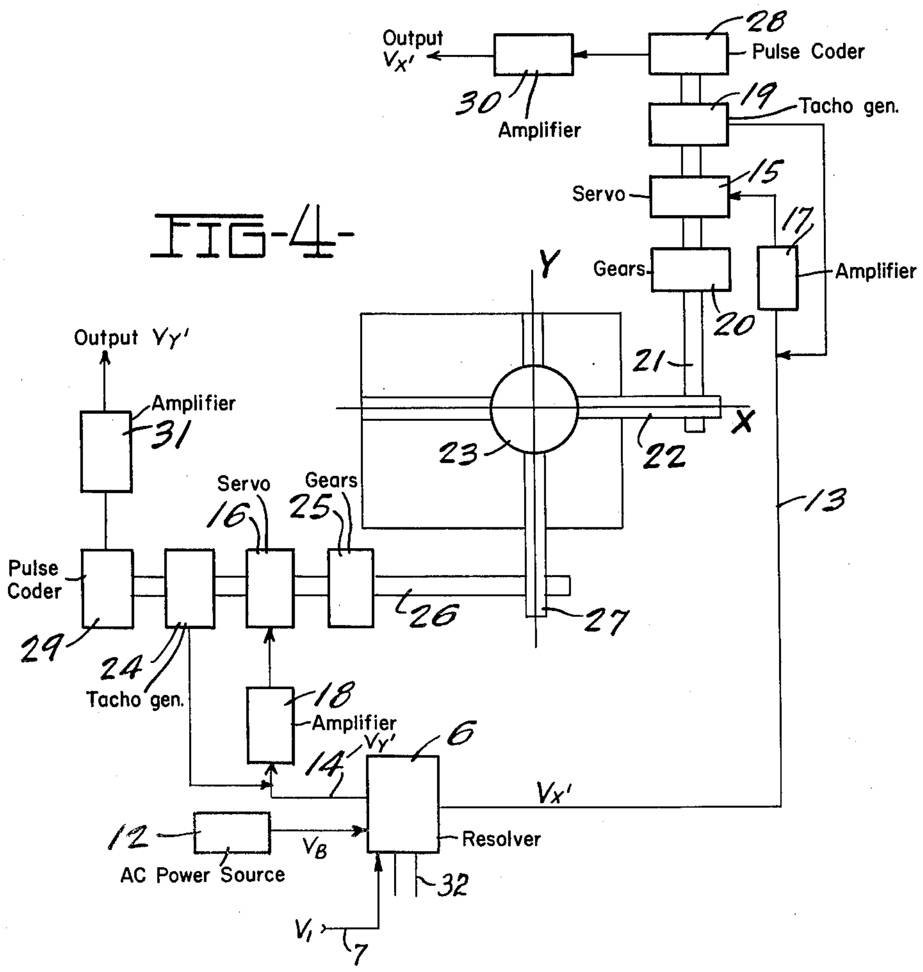
FIG. 4 is a block diagram of the curve tracer.

FIG. 4 shows the servomechanism of the first system executing the position control of the scanning mechanism and the resolver that has been described before.

Resolver 6 is mechanically combined with scanning head 4, as has been explained in FIG. 3, composing the scanning mechanism together with scanning head 4, servomotor 10, and amplifier 9, as will be described later. Resolver 6 is supplied with a commercial A.C. power, for instance that of 50 c./s., from power source 12, and control voltages are supplied to two servomotors 15, 16 via lines 13, 14 and amplifiers 17 and 18 respectively. In the resolver A.C. voltage $V_B$ supplied from power source 12 is divided into two: voltage $V_X$ in the direction of X-axis and voltage ($V_y$) in the direction of Y-axis. The magnitudes of voltages $V_x$, $V_y$ will be brought by the displaced angle of resolver 6 from its standard position, i.e., the angle (which will be denoted by $\theta$) made by the line connecting two scanning diodes $D_1$, $D_2$ and X-axis in FIG. 2, to the ones given by the following formulae:

$$V_x = V_B \cos\theta \quad (1)$$
$$V_y = V_B \sin\theta \quad (2)$$

Voltages $V_x$, $V_y$ in the two directions, components produced as the result of splitting, are supplied to drive servomotors 15, 16 through amplifiers 17, 18 respectively. The two servomotors 15, 16 are respectively equipped with tacho generator 19, 24 and speed varying gears 20, 25, forming two servomechanisms, and these two servomechanisms form the servomechanism of the first system mentioned before.

Out of two servomechanisms of the first system the first one having servomotor 15 drives the rotation as is well known, and controls via X-axis 22 the movement of scanning mechanism 23 along the X-axis. On the other hand, the second servomechanism 16 of the first system drives the rotation of rotating axis 26, and controls via Y-axis 27 the movement of scanning mechanism 23 in the direction of the Y-axis. Here the scanning mechanism 23 shows the one consisting of scanning head 4, resolver 6, servomotor 10, and so on, which have been shown in FIG. 3.

Scanning mechanism 23 is fixed to X-axis 22 and Y-axis 27, and its position control can be effected by two servomotors 15 and 16.

When two servomotors 15, 16 are controlled by A.C. voltage $V_B$ alone of power source 12, scanning mechanism 23 runs only straightforward on the line making angle ($\theta$) with X-axis. Tracing of an arbitrary curve by servomechanism 23 is effected by the control produced by the voltage difference $\Delta V_1$ between first scanning diode $D_1$ and standard diode $D_s$ explained in FIG. 2.

The voltage difference $\Delta V_1$ is supplied via the line 7 to the resolver 6, where it is resolved into two voltages $\Delta V_x$ and $\Delta V_y$ in the direction of X-axis and Y-axis, respectively. The resolved two voltages are then superposed on $V_x$ and $V_y$ respectively, which are the components of the voltage $V_B$ given by the power source 12 in the directions of X-axis and Y-axis, respectively, and finally they are applied to the servomotors 15 and 16.

In this case, the resolved two voltages $\Delta V_x$ and $\Delta V_y$ are mathematically expressed as follows:

$$\Delta V_x = \Delta V_1 \sin\theta \quad (3)$$
$$\Delta V_y = \Delta V_1 \cos\theta \quad (4)$$

Hence, the voltages $V_x'$ and $V_y'$ supplied to the servomotors 15 and 16 may be $$V_x' = V_x + \Delta V_x = V_B \cos\theta + V_1 \sin\theta \quad (5)$$
$$V_y' = V_y + \Delta V_y = V_B \sin\theta + \Delta V_1 \cos\theta \quad (6)$$

This means that if the servomotors 15 and 16 are driven by the voltages $V_x'$ and $V_y'$, it is possible to control the scanning mechanism 23 so that its center is always located on the traced curve through the function of the voltage difference $\Delta V_1$ between the first scanning diode $D_1$ and the standard diode $D_s$, as well as through the function of the voltage $V_B$ supplied by the power source 12.

Figure 5:
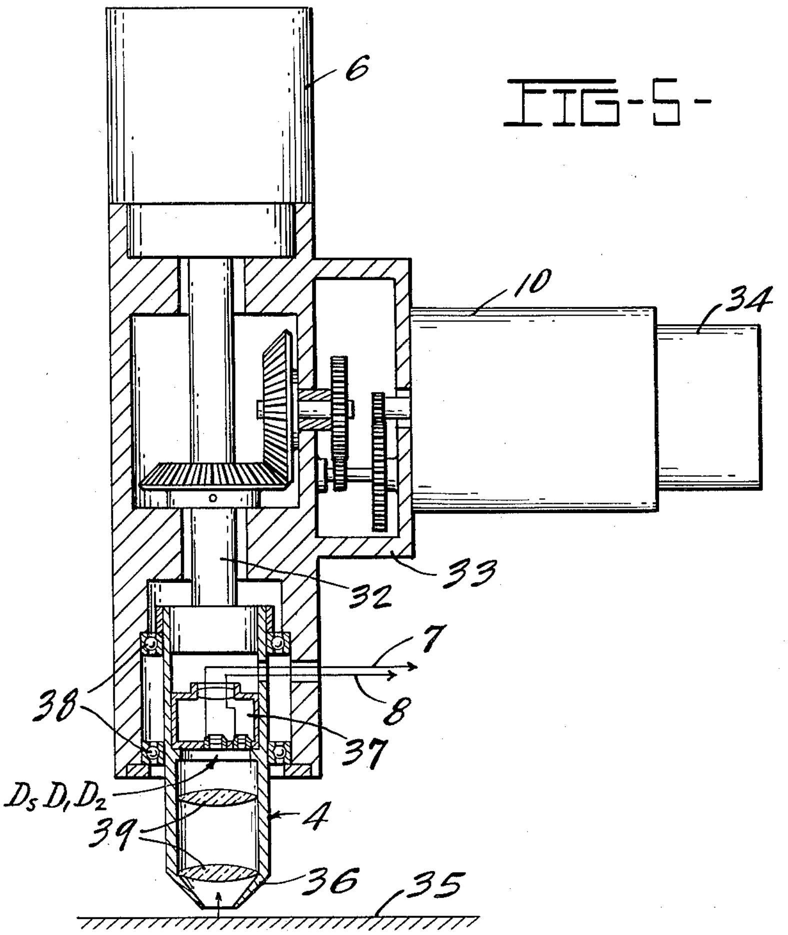
FIG. 5 is a diagrammatic sketch of a cross section of the scanning mechanism.

FIG. 5 shows by the cross-section one example of the structure of the scanning mechanism 23 related to the present invention.

As regards scanning head 4, resolver 6, servomotor 10 constituting the main parts of the scanning mechanism 23, the same symbols as those have been used in FIG. 3 are employed without modification. Here the gear device, which has been shown by 11 in FIG. 3, is composed as the combination of a number of gears, thus forming the speed varying mechanism connecting the rotary axis and servomotor 10. Resolver 6 and scanning head 4 are mutually combined by rotary axis 32 and are supported by supporter 33 in a way permitting their free rotation. On the other hand, servomotor 10 is fixed to supporter 33, and is equipped with generator coaxially. The top of scanning head 4 is equipped with the input light acceptor 36 projected above the paper surface 35 and PN junction diode holder 37, and is held by ball bearing 38 in a way causing no jolt of supporter 33. Acceptor 36 is constructed in the shape of a cylinder, forming the optical device equipped with lenses 39. On the other hand, diode holder 37 is constructed in the form of a frame, and lead wires 7, 8 are derived from the PN junction diodes fixed to this frame. Rays of light reflected from the paper surface on which a curve is drawn are derived into scanning head 4 via input accepter 36, magnified by lens 39, and illuminated exactly onto the diode surfaces equipped on the frame.

What I claim is:

1. A scanning device for tracing a curve defined by a line on a surface comprising, means for supporting a curve inscribed surface in a plane, a scanning head movably mounted over the plane of said curve inscribed surface and spaced therefrom in a parallel plane, said scanning head being mounted for linear movement in said parallel plane and for rotation about an axis normal to said plane, one standard and two scanning PN junction diodes all having equal light sensitive areas mounted in said scanning head for generating voltages responsive to the differences in the incident light reflected from the line defining the curve and the surface on which the curve is defined and proportional to the areas of the light sensitive surfaces receiving the reflected incidental light, said scanning diodes being mounted in line and when positioned with respect to a straight line part of said curve to have half their respective light sensitive surfaces masked by said curve, and said standard diode having half of its light sensitive surface permanently masked and mounted equidistant from the two scanning diodes so that no part of the light sensitive surface is masked by the line defining said curve, means for taking the voltage differences between the voltages generated between each of the two scanning diodes and the standard diode respectively, means for resolving said voltage differences into coordinate components, means responsive to each of the coordinate components of said voltage differences for continuously positioning said scanning head along said curve and for rotating said scanning head to maintain the line of said scanning diodes tangent to said curve, whereby said curve is traced by means of the proportion of the respective areas of the light sensitive surfaces of the diodes illuminated by said reflected light.

2. A scanning device for tracing a curve defined on a surface, said device comprising; means for supporting a curve inscribed surface; a scanning head mounted in a plane parallel to the supported surface and movable linearly in said plane and rotationally about an axis normal to said plane; three PN junction diodes mounted in said head, two said diodes defining a straight line and the third diode being equidistantly spaced from the other two diodes and permanently masked in the same proportion that the curve masks the two diodes when both of the pair are equally masked by the curve, said diodes for receiving light reflected from the curved end surface on respective areas defined by and dependent upon the relative positions of the diodes with respect to each other and the curve, and said diodes responsive to said reflected light for generating a continuous voltage proportional to the area of said diodes illuminated by said reflected light; and means connected to receive the voltages generated by each of said diodes and to respond to the differences between said voltages for continuously positioning said scanning head to follow the curve.

3. A scanning device for tracing a curve defined on a surface, said device comprising; a supporting structure; a single tube scanning head, having a center axis, mounted in the supporting structure for moving linearly over said surface and rotationally around said axis; a plurality of light sensitive means mounted in the scanning head for simultaneously receiving reflected light from said surface, said light-sensitive means generating voltages responsive and proportional to the respective amounts of reflected light each receives, said light-sensitive means being positioned in said scanning head with one on said center axis and at least two off center and equidistant from said center light-sensitive means and each other, one said off-center light-sensitive means being permanently masked on the side adjacent the other light-sensitive means, to receive the same amount of reflected light from said surface only as each said other light-sensitive means receives from said surface and said curve when said scanning head is positioned over said surface and curve for said other light-sensitive means to receive equal amounts of reflected light; circuit means interconnecting said light-sensitive means for taking the respective voltage differences between the voltage generated by said permanently masked light-sensitive means and each of the voltages generated by said respective unmasked light-sensitive means; means responsive to said voltage differences between said masked light-sensitive means and an off-center light-sensitive means for rotating said scanning head around said axis to keep said off-center unmasked light-sensitive means over said line; and means responsive to said voltage differences between said masked light-sensitive means and both said unmasked light-sensitive means for linearly moving said scanning head to keep said center light-sensitive means over said curve whereby said scanning head traces said curve defined in said surface.

References Cited in the file of this patent

UNITED STATES PATENTS

| | | |
|---|---|---|
| 2,132,767 | Chance | Oct. 11, 1938 |
| 2,419,641 | Hart | Apr. 29, 1947 |
| 2,622,485 | Martellotti | Dec. 23, 1952 |
| 2,641,712 | Kircher | June 9, 1953 |
| 2,810,316 | Snyder | Oct. 22, 1957 |
| 2,933,668 | Brouwer | Apr. 19, 1960 |

FOREIGN PATENTS

| | | |
|---|---|---|
| 136,066 | Australia | Jan. 26, 1950 |